United States Patent
Choa

(10) Patent No.: US 6,718,087 B2
(45) Date of Patent: Apr. 6, 2004

(54) SYSTEM AND METHOD FOR REDUCING DIFFERENTIAL MODE DISPERSION EFFECTS IN MULTIMODE OPTICAL FIBER TRANSMISSIONS

(75) Inventor: Fow-Sen Choa, Baltimore, MD (US)

(73) Assignee: University of Maryland Baltimore County, Baltimore, MD (US)

( * ) Notice: Subject to any disclaimer, the term of this patent is extended or adjusted under 35 U.S.C. 154(b) by 363 days.

(21) Appl. No.: 09/813,102

(22) Filed: Mar. 22, 2001

(65) Prior Publication Data

US 2001/0036334 A1 Nov. 1, 2001

Related U.S. Application Data

(60) Provisional application No. 60/191,226, filed on Mar. 22, 2000.

(51) Int. Cl.[7] .............................. G02B 6/00; G02B 6/26
(52) U.S. Cl. ............................ 385/27; 385/28; 385/147
(58) Field of Search ..................... 385/27, 28, 31, 385/147; 250/227.11, 227.12

(56) References Cited

PUBLICATIONS

B.L. Kasper, "Equalization of Multimode Optical Fiber Systems," The Bell System Technical Journal, Sep. 1982, pp. 1367–1388.

*Primary Examiner*—Akm Enayet Ullah
(74) *Attorney, Agent, or Firm*—Fleshner & Kim LLP

(57) ABSTRACT

A system and method for compensating for unwanted modes in multimode fiber transmissions includes a detector that receives an optical signal transmitted through a multimode optical fiber and converts the transmitted optical signal to a detector signal, an adaptive equalizer that generates an adaptive equalizer signal that, when combined with the detector signal, compensates for unwanted modes in the detector signal, and an adder that combines the adaptive equalizer signal with the detector signal.

30 Claims, 6 Drawing Sheets

SYSTEM AND METHOD FOR REDUCING DIFFERENTIAL MODE DISPERSION EFFECTS IN MULTIMODE OPTICAL FIBER TRANSMISSIONS

RELATED APPLICATIONS

Priority is claimed to U.S. Provisional Application 60/191,226 filed Mar. 22, 2000, which is hereby incorporated by reference.

BACKGROUND OF THE INVENTION

This invention relates to data transmission over multimode optical fiber and, more particularly, to a system and method for reducing inter-symbol interference by compensating for differential mode dispersion.

The majority of optical fiber that has been installed for high-speed data transmission is predominately multimode optical fiber. The main source of bit errors in a multimode fiber (MMF) transmission system is inter-symbol interference (ISI) caused by differential mode dispersion (DMD). DMD imposes an upper limit on the bandwidth-distance product of the MMF.

Specifically, DMD limits the bandwidth-distance product of an MMF to approximately 300 MHz-km. A bandwidth-distance product of 300 MHz-km will limit the transmission distance of an MMF to approximately 30 meters at a data rate of 10 Gb/s.

Prior art methods to overcome the low bandwidth-distance product exhibited by MMFs include: (1) selective excitation of a limited number of modes, as described in L. Raddaz et al. "An Experimental and Theoretical Study of the Offset Launch Technique for the Enhancement of the Bandwidth of Multimode Fiber Links," IEEE J. Lightwave Technology, pages 324–331 (1998); (2) alternative modulation schemes, such as those described by T. K. Woodward et al, "1-Gb/s BTSK Transmission at 850 nm Over 1 km of 62.5-$\mu$m Core Multimode Fiber Using a Single 2.5 GHz Subcarrier," IEEE Photon: Technology Letters, Vol. 11, pp. 382–384 (1999), E. J. Tyler et al., "Transmission of a Single 2.5 Gb/s Subcarrier Modulated Channel Over 300 m 6.25 $\mu$m Multimode Fiber," IEEE LEOS annual meeting paper, TuBB4 (2000), and R. Taborek, "Multilevel Serial PMD Update," presented at IEEE 802.3 HSSG, Kauai, Hi. (November 1999); and (3) wavelength division multiplexing techniques, such as those described in B. Lemoff et al., "Low-Cost MM WDM for the Local Area Network," IEEE Summer Topical Meeting, WDM Components Technologies, Montreal, Quebec, Canada paper WC3 (1997) and Q. Xiang, Y. Zhao, Y. Chai, F. S. Choa, "Schematic Studies of 10 Gb/s Transmission Over Multimode Fibers," Proc. IEEE LEOS Annual Meeting, paper TUR 2 pp. 271–272 (November 1999).

Selective excitation of a limited number of modes by offset launching can depress lower order modes and obtain a lower ISI. However, the distance/bit-rate product is limited to approximately 500 Gd.m/s. Alternative modulation schemes and wavelength multiplexing techniques can potentially work, however, they are very costly approaches.

BRIEF SUMMARY OF THE INVENTION

In an exemplary embodiment of the invention, a system for compensating for unwanted modes in multimode fiber transmissions comprises a detector that receives an optical signal transmitted through a multimode optical fiber and converts the transmitted optical signal to a detector signal, and an adaptive equalizer that generates an adaptive equalizer signal that, when combined with the detector signal, compensates for unwanted modes in the detector signal.

The present invention also provides a system for compensating for differential mode dispersion effects in multimode fiber transmissions, comprising a detector that receives an optical signal transmitted through a multimode optical fiber and converts the transmitted optical signal to a detector signal, a decision element that receives the detector signal, determines a symbol represented by the detector signal, and outputs the determined symbol as an output signal, an adaptive equalizer that receives at least a portion of the output signal as a feedback signal and generates an adaptive equalizer signal based on the feedback signal, and an adder that combines the detector signal with the adaptive equalizer signal, thereby compensating for unwanted modes in the detector signal caused by differential mode dispersion in the multimode optical fiber.

The present invention also provides a method of compensating for unwanted modes in multimode fiber transmissions, comprising the steps of converting an optical signal transmitted through a multimode optical fiber to an electrical signal, generating an equalizer signal that, when combined with the electrical signal, reduces unwanted modes in the electrical signal, and combining the equalizer signal with the electrical signal.

DETAILED DESCRIPTION OF THE INVENTION

Figure 1:
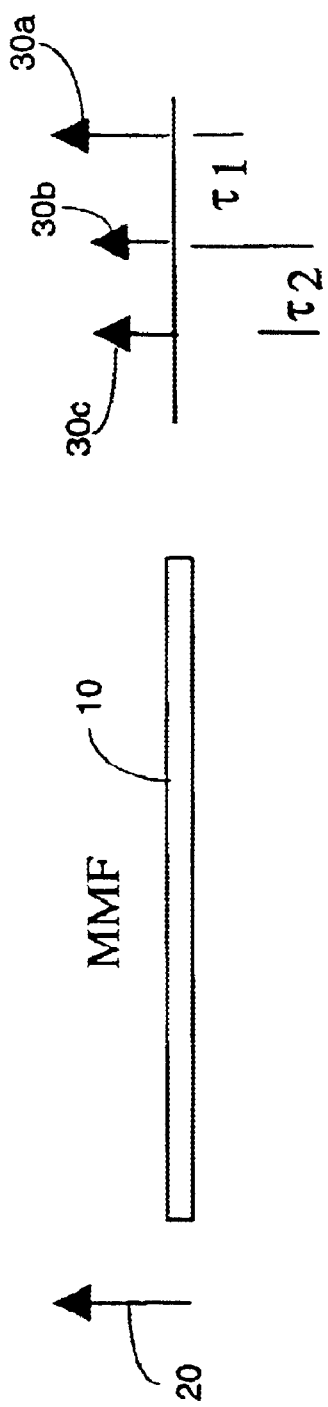
FIG. 1 is a schematic diagram illustrating differential mode dispersion in multimode fibers.

FIG. 1 is a schematic diagram illustrating differential mode dispersion in a multimode fiber (MMF) 10. When an optical pulse 20 is launched into a MMF 10, different modes can be excited in the MMF 10. The number and types of modes excited in the MMF 10 will depend on the injection angle or center offset of the input optical pulse 20.

In the example shown in FIG. 1, three modes (also referred to as "bins") are excited in the MMF 10 by the input optical pulse 20. The three modes are a fundamental mode 30a and two other higher order modes 30b and 30c. The fundamental mode 30a traverses a shorter path through the MMF 10, and thus exits the MMF 10 before the two higher order modes 30b and 30c. The two higher order modes 30b and 30c traverse a longer path through the MMF 10. Higher order mode 30b is delayed by $\tau_1$ with respect to the fundamental mode 30a. Higher order mode 30c is delayed by $\tau_2$ with respect to higher order mode 30b, for a total delay of $(\tau_1+\tau_2)$ with respect to the fundamental mode 30a. The type and number of modes excited in the MMF 10 for a given injection angle of the input optical pulse 20 defines the delay bin profile (i.e., the number of modes and their delays) for that injection angle. The multi modes excited in the MMF 10 results in inter-symbol interference (ISI).

Figure 2A:
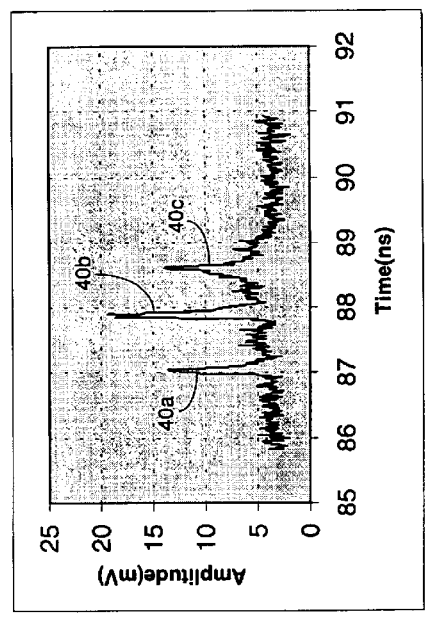
FIGS. 2(a)–2(c) are plots showing the amplitudes of different modes excited by optical pulses launched into a multimode fiber.
Figure 2C:
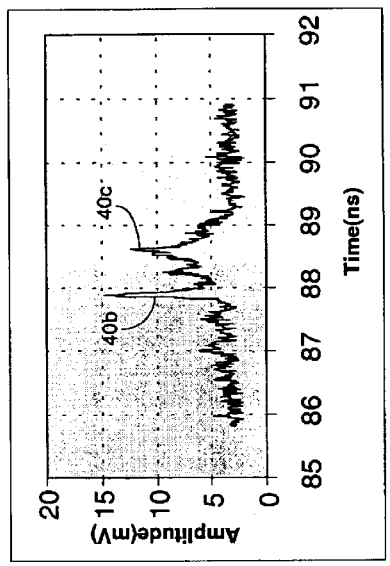
Figure 2B:
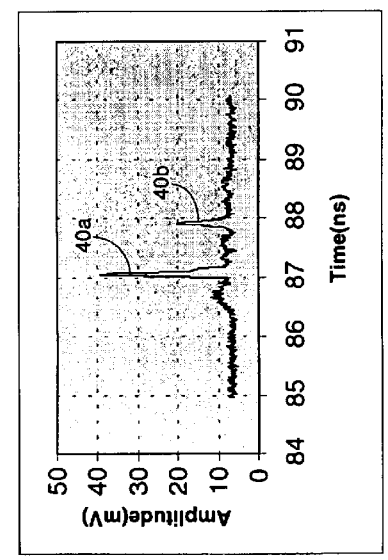

FIGS. 2(a)–2(c) are plots showing the amplitudes of different modes excited in a MMF 10 when an optical pulse 20 is launched into the MMF at different injection angles. The modes shown in FIGS. 2(a), 2(b) and 2(c) where generated by launching an input optical pulse 20 into a 1.5 km long conventional MMF with a 6.25 μm core. The optical pulse 20 was generated with a gang switched DFB laser emitting at a wavelength of 1.55 μm.

The plot shown in FIG. 2(a) shows a fundamental mode 40a, which exists the MMF 10 approximately 87 ns after the optical pulse 20 was launched into the MMF 10, a higher order mode 40b, which exists the MMF 10 approximately 0.9 ns after the fundamental mode 40a, and a higher order mode 40c, which exists the MMF 10 approximately 1.6 ns behind the fundamental mode 40a.

In the plot shown in FIG. 2b, the higher order mode 40c was depressed by adjusting the injection angle of the optical pulse 20. The fundamental mode 40a and the higher order mode 40b are still excited in the MMF 10.

In the plot shown in FIG. 2c, the fundamental mode 40a is depressed by adjusting the injection angle of the optical pulse 20. The higher order modes 40b and 40c are still exited in the MMF 10.

Figure 3:
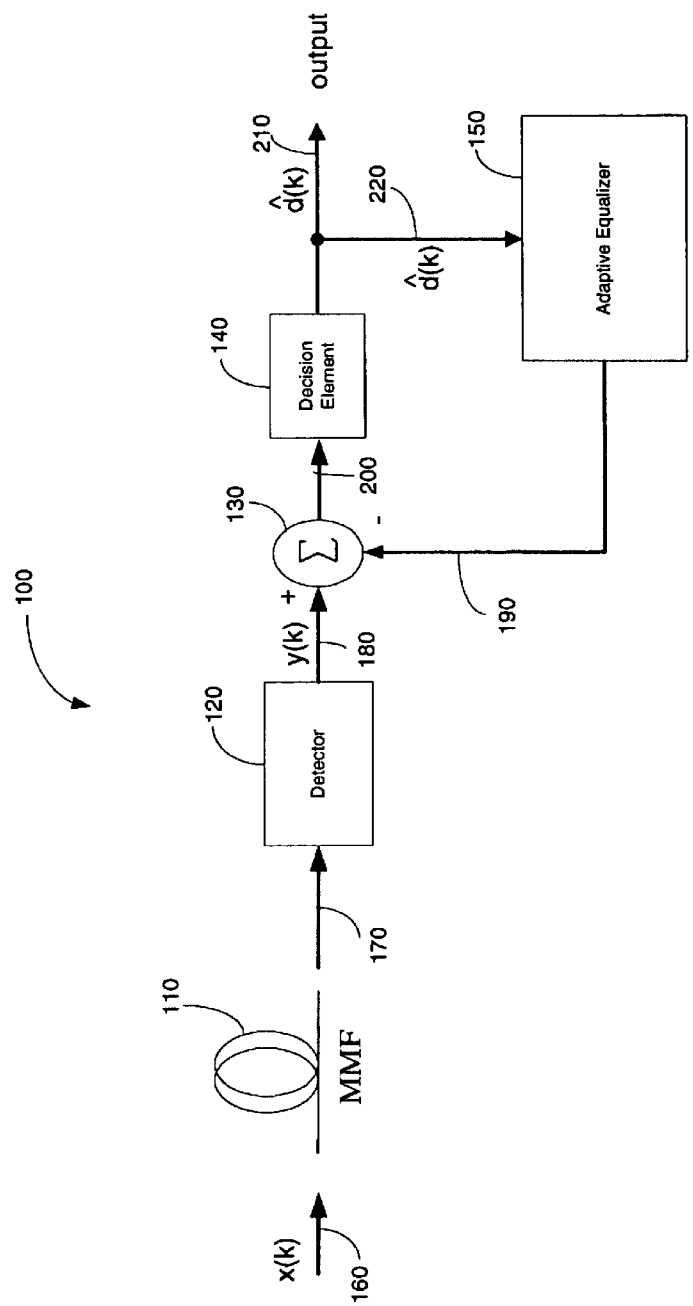
FIG. 3 is a block diagram of a system for reducing inter-symbol interference in multimode fiber transmissions, in accordance with one preferred embodiment of the present invention.

FIG. 3 is a block diagram of a system for reducing inter-symbol interference in multimode fiber transmissions, in accordance with one preferred embodiment of the present invention. The system 100 comprises a MMF 110, a detector 120, an adder 130, a decision element 140 and an adaptive equalizer 150.

In operation, input optical signal 160, which is encoded with a data stream represented by "x(k)" is launched into the MMF 110 and exits the MMF 110 as transmitted optical signal 170. The transmitted optical signal 170 is directed to the detector 120, which generates a detector signal 180 that is proportional to the amplitude of transmitted optical signal 170. The data stream that is encoded into detector signal 180 is represented by "y(k)". The detector signal 180 is combined with the output 190 of the adaptive equalizer 150 at the adder 130. The combined signal 200 is then sent to the decision element 140.

The decision element 140 determines which particular symbol in a symbols set is represented by the data stream y(k). The decision element 140 can use various decision processes. The decision element 140 may be a simple slicer or can use a more sophisticated process. The slicer may use a threshold logic function or a sigmoidal function. Other functions may be utilized with the present invention as well. The following is some examples of possible decision processes/algorithms that are well known in the art:

1. Bussgang Algorithms.
  a) Decision Directed (Lucky).
  b) Generalized Dec. Directed (Karaoguz).
  c) Stop-and-Go (Picchi and Prati).
  d) Sato Algorithm (Sato).
  e) Generalized Sato (Benveniste).
  f) Bussgang (Bellini).
  g) Crimno (Nikias).
  h) Godard Algo. (Godard).
  i) CMA Algo. (Treichler).
2. Polyspectra Algorithms.
  a) Tricepstrum (Hatzinakos).
  b) Power Cesptrum (Bessios, et al.)
  c) Roth Tricepstrum (Brooks and Nickias)
3. Non Linear Filter Structures
  a) Volterra Series
  b) Neural Network Based (Gibson, Kohonen, Chen)

The assigned symbols are represented as "$\hat{d}(k)$", and are provided as the output 210 of the system 100. The determined symbol $\hat{d}(k)$ is also provided as the feedback signal 220 to the adaptive equalizer 150.

Adaptive equalizers are well known in the art and are typically finite impulse response filters with adjustable coefficients (weights), as will be explained in more detail below. By subtracting the adaptive equalizer output 190 from the detector output 180 at adder 130, any unwanted higher order modes present in the detector signal 180 are removed. Thus, the combined signal 200 exhibits very little ISI, and thus the output 210 of the system 100 will comprise the correct symbols $\hat{d}(k)$.

Figure 4:
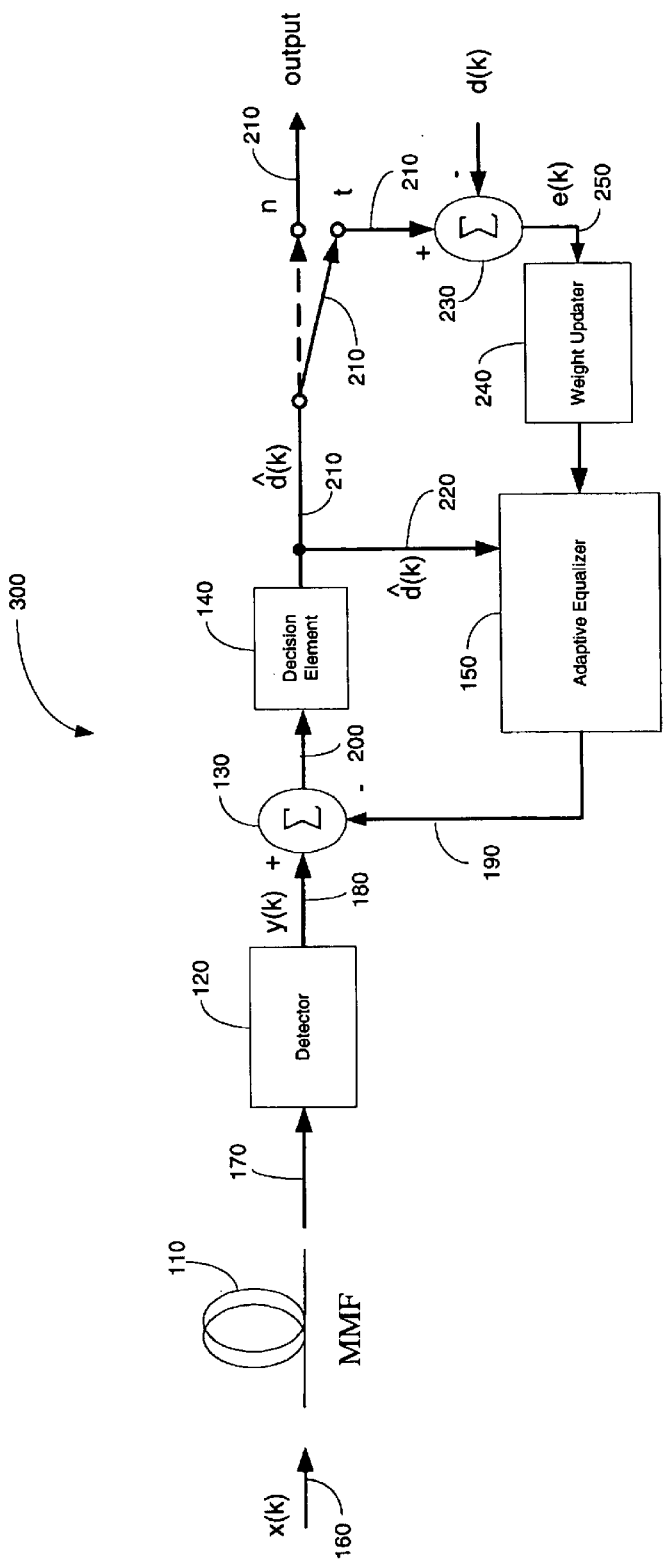
FIG. 4 is a block diagram of a system for reducing inter-symbol interference in a multimode fiber transmissions, in accordance with a second preferred embodiment of the present invention.

The weights used in the adaptive equalizer 150 are preferably adjusted to emulate and compensate for the multi-path characteristics of the MMF 110. FIG. 4 is a block diagram of a system 300 for reducing ISI in multimode fiber transmissions, in accordance with a second preferred embodiment of the present invention. The system 300 is identical to the system 100 of FIG. 3, except that system 300 includes means for adjusting the weights (coefficients) in the adaptive equalizer 150.

Adjustment of the weights in the adaptive equalizer 150 is preferably performed adaptively during the transmission of known information by using an objective function and a weight adjustment process. The objective function is usually minimized or optimized by the weight adjustment process. The weight adjustment process is executed by a weight updater 240, which preferably utilizes an adaptive algorithm that adjusts the weights of the adaptive filter 150 to minimize the objective function. The objective function is preferably an error signal 250 in the embodiment of FIG. 4, as will now be explained in more detail.

The system 300 has a normal mode and a training mode. In the training mode (represented by the letter "t" in FIG. 4), the system output 210 is directed to an adder 230. In the training mode, the data stream x(k) encoded onto the input optical signal 160 is preferably training data stream.

At time "k", the decision element 140 generates a scalar output $\hat{d}(k)$ on system output 210, which represents a determined symbol. Ideally, the determined symbol $\hat{d}(k)$ corresponds to the input symbol represented by data x(k). However, as discussed above, ISI caused by differential mode dispersion can result in a determined symbol $\hat{d}(k)$ that is not the same as the input symbol x(k).

In the training mode, the determined symbol $\hat{d}(k)$ in signal 210 is sent to an adder 230, which compares the determined symbol $\hat{d}(k)$ with data "d(k)". Data d(k) is either an exact replica of the input symbol represented by data x(k), or a representation of a known property of the input symbol.

The difference between the determined symbol $\hat{d}(k)$ and data d(k) is sent to the weight updater 240 as error signal 250. The weight updater 240 sends a weight adjustment signal 260 to the adaptive equalizer 150 that adjusts the weights of the adaptive equalizer 150.

The adaptive algorithm used by the weight updater 240 adjusts the weights of the adaptive equalizer 150 (in accordance with the weight adjustment signal 260) so as to minimize the error signal 250. The adaptive algorithm is preferably a least mean square (LMS) algorithm. However, the adaptive algorithm can be any other fast converging algorithm known in the art.

The weight adjustment signal 260 updates the weight vector, $w(k)=[w_1(k), W_2,(k), \ldots ,w_n(k)]^T$, of the adaptive equalizer 150 adaptively to emulate and compensate for the multi-path characteristics of the MMF 110. Once the weights converge, the training mode is stopped, and the system output signal 210 is directed out of the system 300. At that point, the adaptive equalizer 150 operates with the fixed weights, $w^*(k_T)=[w_1(k_T), w_2(k_T), \ldots w_n(k_T)]^T$, to compensate for the multi-path characteristics of the MMF 110.

Once the fixed weights are determined, they can be used as long as the launching conditions (i.e., injection angle and launching offset) of the input optical signal 160 remains the same. It has been verified experimentally that, as long as the launching conditions remain the same, the modes excited in the MMF 110 are very stable and remain essentially unchanged. Thus, the weights determined during the training mode can be used as long as the launching conditions remain the same.

Current Ethernet standards do not allow a repeat of the training mode. Thus, if the system 300 of the present invention is used in a transmission system that utilizes the Ethernet protocol, the launching conditions for each channel must not be changed after the initial training of the system.

Figure 5:
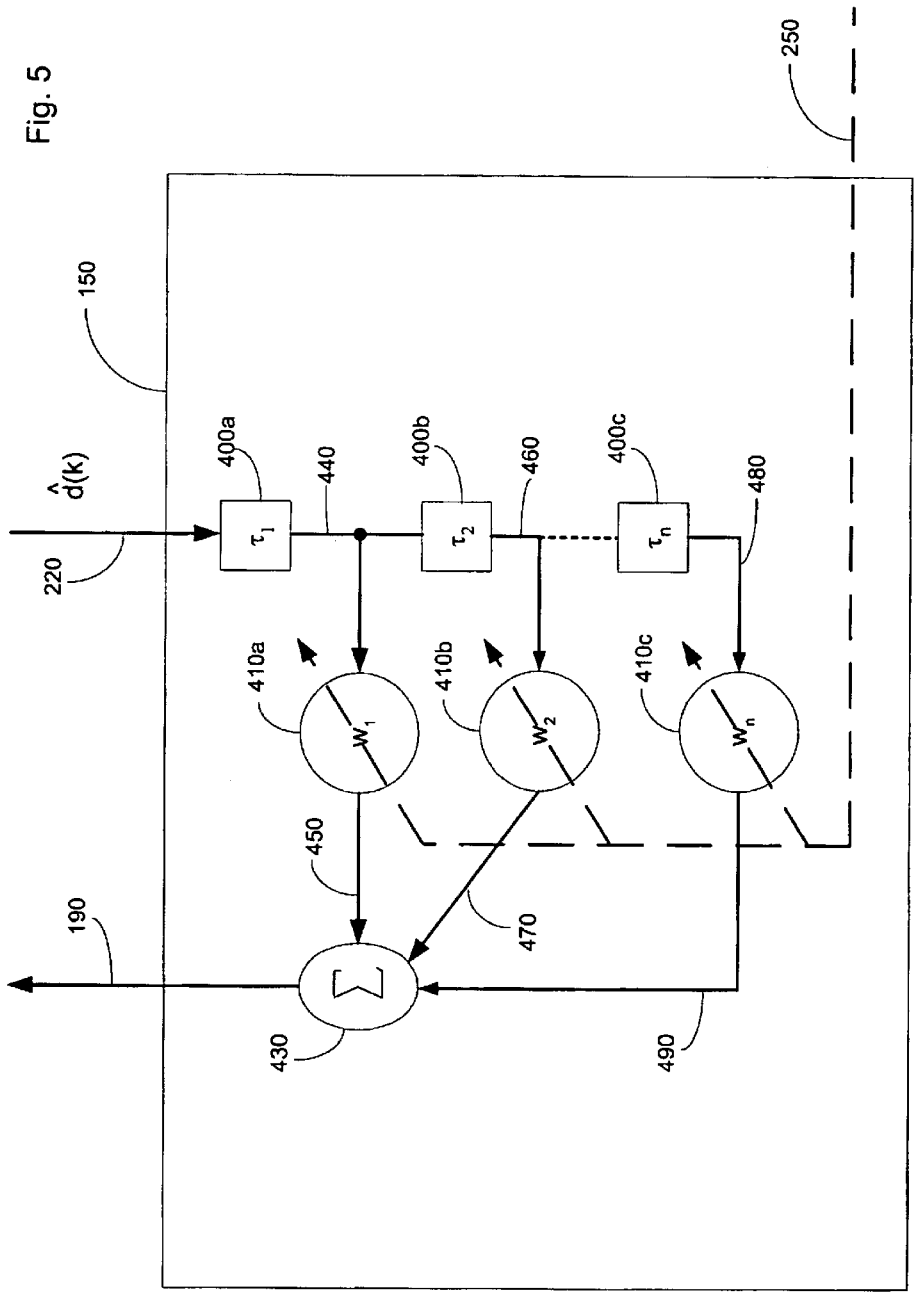
FIG. 5 is a schematic diagram of one preferred embodiment of the adaptive equalizer using the systems of FIGS. 3 and 4.

FIG. 5 is a schematic diagram of one preferred embodiment of the adaptive equalizer 150 used in the systems 100 and 300 described above. The adaptive equalizer 150 includes a series of delay elements 400a–400c, corresponding weights 410a–410c, and adder 430. The weights 410a–410c are each preferably implemented with a variable gain amplifier (tap gain).

A separate delay element and a corresponding weight is preferably provided for each mode that one wants to cancel from the detector signal 180. For example, for the higher order modes shown in FIG. 1, the delay element 400a would be adjusted to impart a delay that corresponds to the delay $\tau_1$ exhibited by higher order mode 30b, element 400b would be adjusted to impart a delay $\tau_2$ that corresponds to the delay of higher order mode 30c with respect to higher order mode 30b.

In operation, signal 220, which represents the determined symbol $\hat{d}(k)$, is input into the first delay element 400a. A delayed signal 440 output by delay element 400a is directed to variable amplifier (weight) 410a and the second delay element 400b. The variable amplifier 410a multiplies the delays signal 440 by a first weight $w_1$, and sends the result to adder 430 as output signal 450.

The delay element 400b receives the delayed signal 440, imparts an additional delay $\tau_2$, and outputs delayed signal 460 to variable amplifier 410b and delay element 400c. The variable amplifier 410b multiplies the delayed signal 460 by weight $w_2$, and outputs the result to adder 430 as output signal 470.

Similarly, delay element 400c receives delayed signal 460, imparts a delay $\tau_n$ to the delayed signal 460, and outputs delayed signal 480 to variable amplifier 410c. Variable amplifier 410c multiplies the delayed signal 480 by weight $w_n$, and outputs the result to adder 430 as output signal 490. The adder 430 adds output signals 450, 470 and 490 and outputs the result as adaptive equalizer output 190.

The weight adjustment signal 260 from the weight updater 240 (shown in FIG. 4) is used to adjust weights 410a–410c during the training mode.

Although, for purposes of illustration, only three delay elements 400a–400c and three corresponding variable amplifier 410a–410c are shown, the number of delay elements and variable amplifiers can vary depending upon the number of unwanted modes one needs to cancel from the detected signal 180.

Figure 6:
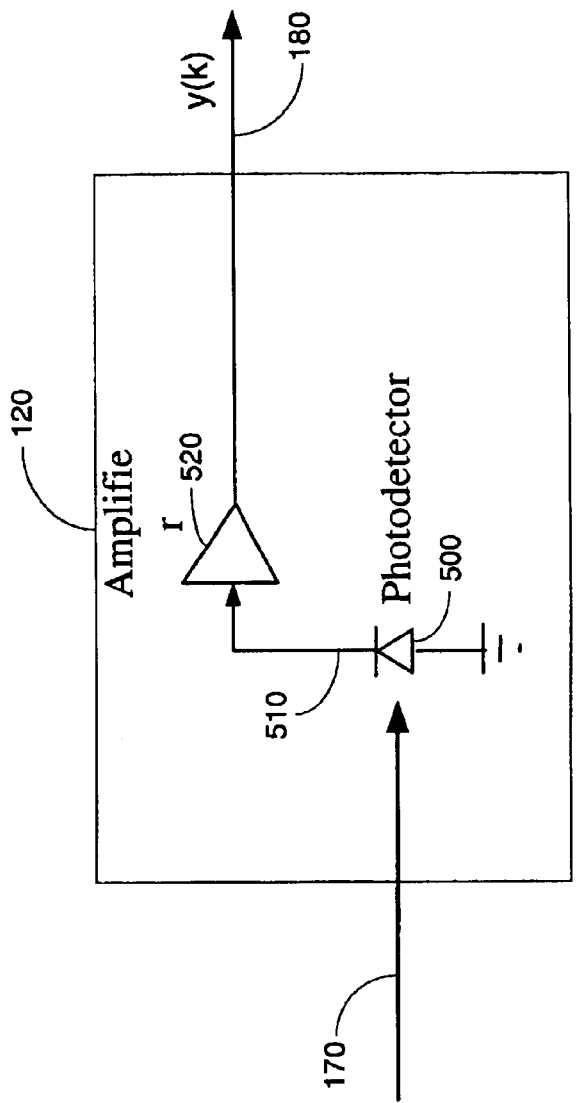
FIG. 6 is a schematic diagram of one preferred embodiment of the protector used in the systems of 3 and 4.

FIG. 6 is a schematic diagram of one preferred embodiment of the detector 120 used in the systems 100 and 300, described above. The detector 120 preferably comprises a photodetector 500 and an amplifier 510. In operation, transmitted optical signal 170 is directed to the photodetector 500, which converts the transmitted optical signal 170 into an electrical signal 510. The electrical signal 510 is then directed to the amplifier 520, which amplifies the electrical signal and outputs the amplified signal as detector signal 180. The data x(k) encoded into the transmitted optical signal is represented by y(k) in the detector signal 10.

While the foregoing description includes many details and specificity's, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A system for compensating for unwanted modes in multimode fiber transmissions, comprising:
    a detector that receives an optical signal transmitted through a multimode optical fiber and converts the transmitted optical signal to a detector signal; and
    an adaptive equalizer that generates an adaptive equalizer signal that, when combined with the detector signal, compensates for unwanted modes in the detector signal.

2. The system of claim 1, wherein the unwanted modes in the detector signal are caused by differential mode dispersion effects in the multimode optical fiber.

3. The system of claim 1, wherein the adaptive equalizer comprises a finite impulse response filter with adjustable coefficients.

4. The system of claim 1, further comprising an adder that combines the detector signal with the adaptive equalizer signal.

5. The system of claim 4, further comprising a decision element that receives the combined detector and adaptive equalizer signal, determines a symbol represented by the combined signal, and outputs the determined symbol as an output signal.

6. The system of claim 5, wherein at least a portion of the output signal is sent to the adaptive equalizer as a feedback signal, wherein the adaptive equalizer generates the adaptive equalizer signal based on the feedback signal.

7. The system of claim 6, wherein the adaptive equalizer comprises:
    at least one delay element in series, wherein a first of the at least one delay element receives the feedback signal;
    a respective amplifier for each delay element, wherein each amplifier receives a delayed signal from its respective delay element and multiplies the delayed signal by a weight; and
    an adder that combines weighted signals from each of the amplifiers and outputs the combined weighted signals as the adaptive equalizer signal.

8. The system of claim 7, wherein the at least one delay element comprises a delay element for each unwanted mode in the detector signal.

9. The system of claim 7, further comprising a weight updater that, during a training mode, determines a weight for each amplifier.

10. The system of claim 8, wherein the weight updater determines each weight based on a difference between the determined symbol and a symbol transmitted by the multimode optical fiber.

11. The system of claim 8, wherein the weight updater determines each weight based on a difference between the determined symbol and a known property of a symbol transmitted by the multimode optical fiber.

12. The system of claim 9, wherein the weight updater determines each weight using a least mean square algorithm.

13. A system for compensating for unwanted modes in multimode fiber transmission, comprising:
    detector means for receiving an optical signal transmitted through a multimode optical fiber and converting the transmitted optical signal to a detector signal; and
    adaptive equalizer means for generating an adaptive equalizer signal that, when combined with the detector signal, compensates for unwanted modes in the detector signal.

14. The system of claim 13, wherein the unwanted modes in the detector signal are caused by differential mode dispersion effects in the multimode optical fiber.

15. The system of claim 13, further comprising combining means for combining the detector signal and the equalizer signal.

16. The system of claim 15, further comprising decision means for receiving the combined detector and equalizer signal, determining a symbol represented by the combined signal, and outputting the determined symbol as an output signal.

17. The system of claim 16, wherein a portion of the output signal is sent to the equalizer means as a feedback signal, wherein the equalizer means derives the equalizer signal based on the feedback signal.

18. The system of claim 17, wherein the equalizer means comprises:
    delay means for receiving and delaying the feedback signal;
    amplifying means for receiving the delayed feedback signal from the delay means and multiplying the delayed feedback signal by at least one weight; and
    combining means for combining weighted signals from the amplifying means and outputting the combined weighted signals as the equalizer signal.

19. The system of claim 18, further comprising weight updating means for, during a training mode, determining the at least one weight.

20. The system of claim 19, wherein the weight updating means determines the weights using a least mean square algorithm.

21. A system for compensating for differential mode dispersion effects in multimode fiber transmissions, comprising:
    a detector that receives an optical signal transmitted through a multimode optical fiber and converts the transmitted optical signal to a detector signal;
    a decision element that receives the detector signal, determines a symbol represented by the detector signal, and outputs the determined symbol as an output signal;
    an adaptive equalizer that receives at least a portion of the output signal as a feedback signal and generates an adaptive equalizer signal based on the feedback signal; and
    an adder that combines the detector signal with the adaptive equalizer signal, thereby compensating for unwanted modes in the detector signal caused by differential mode dispersion in the multimode optical fiber.

22. A fiber optic data channel, comprising:
    a multimode optical fiber that transmits an optical signal;
    a detector that receives the optical signal transmitted through the multimode optical fiber and converts the transmitted optical signal to a detector signal;
    an adaptive equalizer that generates an adaptive equalizer signal that, when combined with the detector signal, compensates for unwanted modes in the detector signal; and
    an adder that combines the adaptive equalizer signal with the detector signal.

23. The fiber optic data channel of claim 22, wherein the unwanted modes are caused by differential mode dispersion in the multimode optical fiber.

24. A fiber optic data network comprising the fiber optic channel of claim 22.

25. A method of compensating for unwanted modes in multimode fiber transmission, comprising the steps of:
    converting an optical signal transmitted through a multimode optical fiber to an electrical signal;
    generating an adaptive equalizer signal that, when combined with the electrical signal, reduces unwanted modes in the electrical signal; and
    combining the adaptive equalizer signal with the electrical signal.

26. The method of claim 25, wherein the unwanted modes are caused by differential mode dispersion in the multimode optical fiber.

27. The method of claim 25, further comprising the steps of:
    determining a symbol represented by the electrical signal; and
    outputting the determined symbol an output signal.

28. The method of claim 27, wherein the steps of generating an adaptive equalizer signal comprises:
    receiving at least a portion of the output signal as a feedback signal;
    delaying the feedback signal;
    determining at least one weight;
    multiplying the delayed feedback signal by the at least one weight; and
    combining weighted signals to generate the adaptive equalizer signal.

29. The method of claim 28, wherein the at least one weight is determined during a training mode.

30. The method of claim 29, wherein the at least one weight is determined based on a difference between the determined symbol and a symbol transmitted by the multimode optical fiber.

* * * * *